United States Patent [19]
Smith

[11] Patent Number: 6,130,752
[45] Date of Patent: Oct. 10, 2000

[54] ON-LINE COLOR MONITORING AND CONTROL SYSTEM AND METHOD

[75] Inventor: Richard Smith, Abingdon, Va.

[73] Assignee: Prisma Fibers, Inc., Bristol, Va.

[21] Appl. No.: 09/044,872

[22] Filed: Mar. 20, 1998

[51] Int. Cl.⁷ .................................................. G01J 3/50
[52] U.S. Cl. .............................. 356/425; 356/402; 8/400; 366/132; 250/226
[58] Field of Search ..................................... 356/402, 405, 356/406, 407, 408, 425, 429; 250/226; 8/400; 366/132

[56] References Cited

U.S. PATENT DOCUMENTS

| | | | |
|---|---|---|---|
| 3,030,795 | 2/1962 | McKinney et al. ...................... | 356/246 |
| 3,388,261 | 6/1968 | Roberts et al. . | |
| 3,972,854 | 8/1976 | Costolow . | |
| 4,403,866 | 9/1983 | Falcoff et al. ............................ | 366/132 |
| 4,684,488 | 8/1987 | Rudolph . | |
| 4,688,178 | 8/1987 | Connelly et al. . | |
| 4,745,555 | 5/1988 | Connelly et al. . | |
| 4,761,129 | 8/1988 | Aste et al. . | |
| 4,788,650 | 11/1988 | Willis et al. . | |
| 5,053,176 | 10/1991 | Cameron et al. . | |
| 5,092,168 | 3/1992 | Baker . | |
| 5,282,141 | 1/1994 | Faas et al. . | |
| 5,387,381 | 2/1995 | Saloom . | |
| 5,468,586 | 11/1995 | Proper et al. . | |
| 5,526,285 | 6/1996 | Campo et al. . | |
| 5,559,173 | 9/1996 | Campo et al. . | |

*Primary Examiner*—F. L. Evans
*Attorney, Agent, or Firm*—Joseph G. Seeber

[57] ABSTRACT

An on-line color monitoring and control system and method includes feeding of colorant in a given amount or ratio in order to achieve a desired color of a product. The system and method described here achieve reliable on-line color control of synthetic fibers, single moving yarn (or fiber) or a collection of moving fibers. The color characteristic of the product is sensed and processed to generate a control signal for adjusting the amount of colorant being fed. Color measurement takes place either prior to or after spooling of the product.

28 Claims, 7 Drawing Sheets

ON-LINE COLOR MONITORING AND CONTROL SYSTEM AND METHOD

TECHNICAL FIELD

The present invention generally relates to on-line color monitoring and control of fibers produced by an extrusion device. More specifically, the invention relates to the measurement of the color of moving yarn or fibers soon after extrusion. Two alternative sensor mechanisms are disclosed—one which measures color prior to spooling of the product, and another which measures color after the product is collected on the spool. In addition, the color measurement signal is quickly checked against a reference signal using an optical switch.

BACKGROUND ART

In the past, the color of a product produced by an extrusion device has been monitored and controlled in an off-line manner. Typically, the extrusion device or system would be operated until color equilibrium was achieved, followed by collection of a product having a certain color. The spool of collected product would then be removed from the system, and taken to a color laboratory where the color would be measured using an off-line spectrometer. Then, once a color evaluation was made, the spool would be returned to the extrusion device or system, adjustments would be made to the level of the colorant provided to the extrusion device, and another run of about ten minutes or so would be commenced. This process would be repeated until evaluation of the color of the product in the color laboratory indicated that the desired color, within acceptable limits, had been achieved.

The latter process was not only time-consuming and inefficient, but also resulted in substantial waste. That is to say, a large amount of scrap material was produced and wasted during each run. Thus, if several runs during a given period of time were necessary in order to evaluate and adjust the color of the product, a very substantial amount of waste material would result.

The latter system or process was also inefficient from the standpoint of time in that each run would take about ten minutes or so, and then the color evaluation in the laboratory would take another thirty minutes to one hour. Thus, if several repetitions of the evaluation process were necessary before the final acceptable coloration was achieved, the entire pre-production process could take several hours.

Accordingly, there has been a need for the development of an on-line color monitoring and control system and method. Moreover, there is a need for the development of such an on-line color monitoring and control system and method employing the most modern optical technology for both transmission of incident light toward the product and reflection of light from the product, as well as handling and transfer of the light through an optical spectrum analyzer to that portion of the system which actually performs the evaluation of the coloration of the product.

It is recognized that on-line measurement of the color of extruded pellets in compounding operations is known in the art. For example, see the following: U.S. Pat. No. 3,972,854—Costolow and U.S. Pat. No. 5,559,173—Campo. In addition, on-line color control of fiber extrusion has been achieved by measuring the color of a fiber melt. In this regard, see U.S. Pat. No. 4,684,488—Rudolph.

Nevertheless, measurement of the color of moving yarn or fiber (or a filament of a yarn), or of a collection of fibers, is not known in the prior art. Moreover, the employment of alternative sensor mechanisms for measuring color of an extruded product prior to spooling and on-spool, respectively, is also not known in the art. Finally, employment of means for quickly checking the color measurement signal against a reference signal, and specifically use of an optical switch to accomplish that purpose, are also not known in the art.

Therefore, there is a need in the art for development of an on-line color monitoring and control system and method which measures the color of moving yarn or fiber (or filament of a yarn), or of a collection of fibers. Mechanisms for measurement of color both prior to spooling and on-spool are also needed. Finally, a means for quickly checking the color measurement signal against a reference signal, using an optical switch, is also needed.

The following patents are considered to be of background interest relative to the present invention, and are burdened by the disadvantages of prior art methods and arrangements, as discussed above: U.S. Pat. No. 5,526,285—Campo et al.; U.S. Pat. No. 5,468,586—Proper et al.; U.S. Pat. No. 5,387,381—Saloom; U.S. Pat. No. 5,282,141—Faas et al.; U.S. Pat. No. 5,092,168—Baker; U.S. Pat. No. 5,053,176—Cameron et al.; U.S. Pat. No. 4,788,650—Willis et al.; U.S. Pat. No. 4,761,129—Aste et al.; U.S. Pat. No. 4,745,555—Connelly et al.; U.S. Pat. No. 4,688,178—Connelly et al.; U.S. Pat. No. 3,388,261—Roberts et al.;

DISCLOSURE OF INVENTION

The present invention generally relates to an on-line color monitoring and control system and method, and more particularly to a system and method for measuring the color of a product produced by an extrusion device, determining whether the color falls within acceptable limits, and increasing or decreasing the level of the colorant provided to the extrusion device so as to adjust the color of the product.

As discussed in more detail below, the system of the present invention is utilized with an extrusion system. More importantly, the system of the present invention employs a color sensing arrangement which, in conjunction with an optical spectrum analyzer (OSA), provides a color sensor signal to a module (typically, a digital computer). The latter provides a serial data output to a programmable logic controller (PLC), which provides control signals to the feeder/mixer arrangement of the extrusion system for the purpose of adjusting the colorant level of the raw material provided to the extrusion device. Finally, in accordance with the invention, the PLC also provides an output to a network for the purpose of providing status information and the like.

It is to be further understood that, in accordance with the invention, a specially designed optical switch is provided for selecting between a reference signal and a measurement signal so as to provide a corresponding output to the OSA or spectrometer. In addition, in one embodiment, the inventive system employs a spring-loaded, twin-roller measuring arrangement for a light receiver so as to perform color measurement "on spool," and to provide a light measurement signal to the OSA. In a further embodiment of the invention, a yarn guide is employed and color measurement is performed prior to spooling of the material in question. Finally, in accordance with the invention, the color monitoring and control system is software-controlled via a programmed element or PLC connected, via a serial data communications link, to a personal computer.

Therefore, it is a primary object of the present invention to provide an on-line color monitoring and control system and method.

It is an additional object of the present invention to provide a system and method for measuring the color of a product produced by an extrusion device.

It is an additional object of the present invention to provide a system and method which determine whether the color of an extruded product falls within acceptable limits.

It is an additional object of the present invention to provide a system and method which increases and decreases the level of colorant provided to an extrusion device so as to adjust the color of the extruded product.

It is an additional object of the present invention to provide a color monitoring and control system which employs a specially designed optical switch for selecting between a reference signal and a measurement signal.

It is an additional object of the present invention to provide a color monitoring and control system which, in one embodiment employs a spring-loaded, twin-roller measuring arrangement to provide "on spool" color measurement of a product.

It is an additional object of the present invention to provide a color monitoring and control system which, in another embodiment, employs a yarn guide to perform color measurement prior to spooling of the product in question.

It is an additional object of the present invention to provide a color monitoring and control system which is software-controlled via use of a programmed element, such as a PLC, connected via a data communications link to a personal computer.

The above and other objects, and the nature of the invention, will be more clearly understood by reference to the following detailed description, the associated drawings, and the appended claims.

BEST MODE FOR CARRYING OUT THE INVENTION

The invention will now be described in more detail with reference to the various figures of the drawings.

Figure 1:
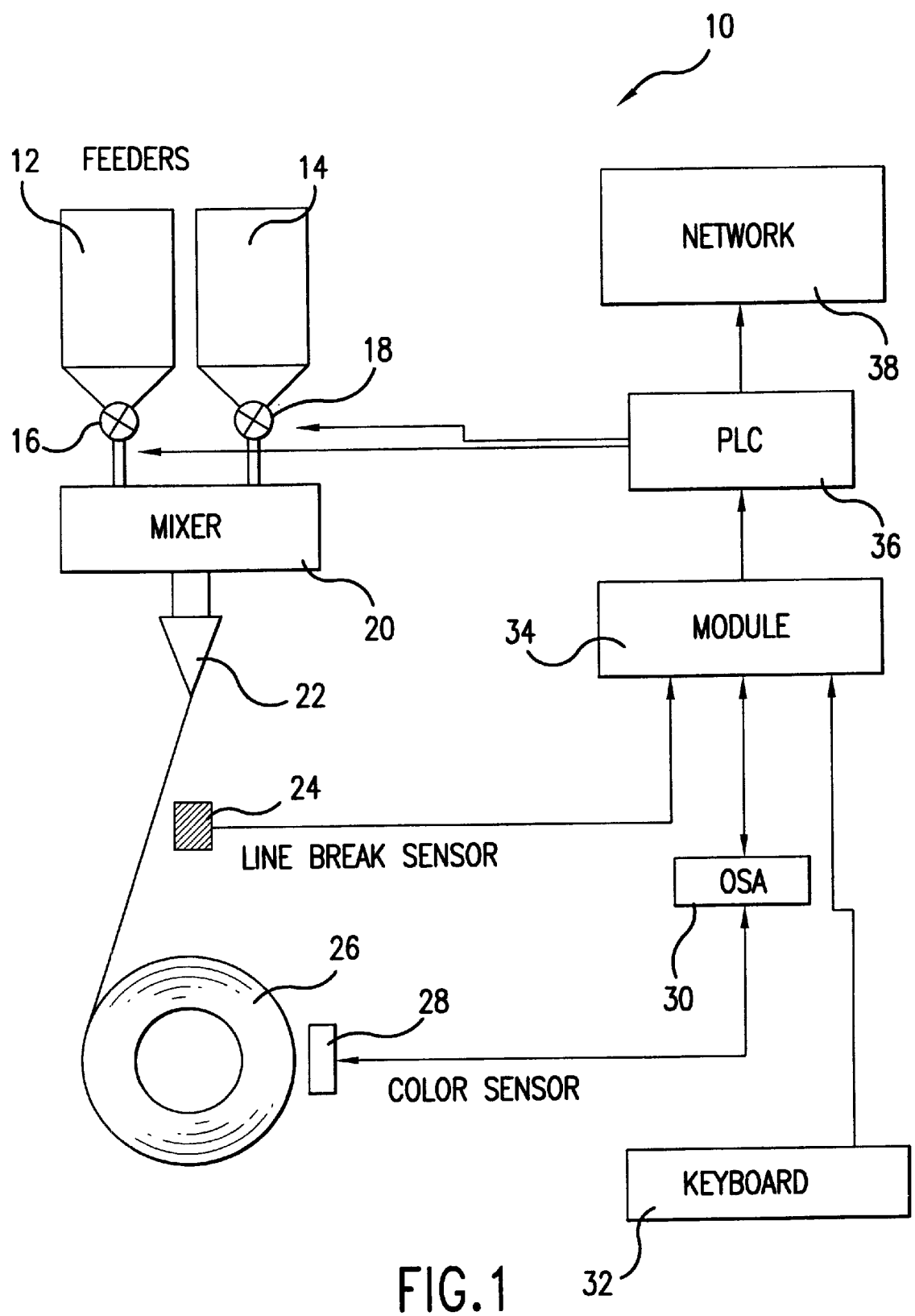
FIG. 1 is a general block diagram of the color monitoring and control system of the present invention.

FIG. 1 is a general block diagram of the color monitoring and control system of the present invention. As seen therein, the on-line color monitoring and control system 10 comprises feeders 12 and 14 connected via control valves 16 and 18, respectively, to a mixer 20. The mixer 20 has its output side connected to an extruder 22, and the extruded output material thereof proceeds past a line break sensor 24 to a spool 26, on which the extruded material is wound.

The system 10 further includes a color sensor 28 disposed adjacent to the spool 26, the output of the color sensor 28 being connected via an optical spectrum analyzer (OSA) or spectrometer 30 to a module 34, which is implemented by a computer. The output of module 34 is connected to the input of programmable logic controller (PLC) 36, and the output of PLC 36 is provided to a network 38. In addition, the PLC 36 provides control outputs to the control valves 16 and 18, respectively.

In operation, feeder 12 is typically loaded with raw material, such as nylon material, to be mixed and extruded, while feeder 14 is typically loaded with colorant in order to provide coloration of the material from feeder 12 once the two constituents are mixed in mixer 20. In response to control signals from PLC 36, valves 16 and 18 provide a corresponding flow of nylon raw material and colorant from feeders 12 and 14, respectively, to the mixer 20, in which those materials are mixed. The resultant mixed material is then provided to an extruder 22 which, in accordance with a conventional extruding process, produces extruded material which is conveyed past the line break sensor 24 to the spool 26, on which the extruded material is wound.

Color sensor 28, which is disposed adjacent to the spool 26, operates in a manner to be described in more detail below to generate an optical signal output corresponding to the color of the material wound on spool 26 as sensed by the sensor 28. The optical signal output of sensor 28 is provided to OSA 30, wherein it is converted into an analog electrical signal output for provision to the module 34.

As previously mentioned, module 34 is, preferably, a computer which receives the analog signal input from OSA 30, converts it into digital form, and then provides a corresponding serial data output to the PLC 36.

PLC 36 operates, in a manner to be described in more detail below, to determine the coloration of the material wound on spool 26, compare it to a desired coloration within acceptable standards, and generate control signals for adjusting the flow rate of the nylon material in feeder 12 and/or the colorant contained in feeder 14 (via valves 16 and 18, respectively) in order to vary the input to mixer 20, and thus vary the coloration characteristics of the mixed material provided by mixer 20 to extruder 22. In addition, PLC 36 provides an information output to a network 38 for dissemination to various personnel involved in or responsible for the operation of the on-line color monitoring and control system 10.

Keyboard 32 is provided in order to receive operator inputs to the system 10, and provides such operator inputs to the module 34. Such operator inputs are provided in order to initiate the operation of the system 10, to set parameters (such as initial feed settings for feeders 12 and 14), and to control the operation of the system during the on-line color monitoring process.

Line break sensor 24 is a conventional device for sensing a break in the line of extruded material provided by extruder 22 to the spool 26. If there is such a break, sensor 24 operates in a conventional manner to provide an alert signal to the module 34.

Figure 2:
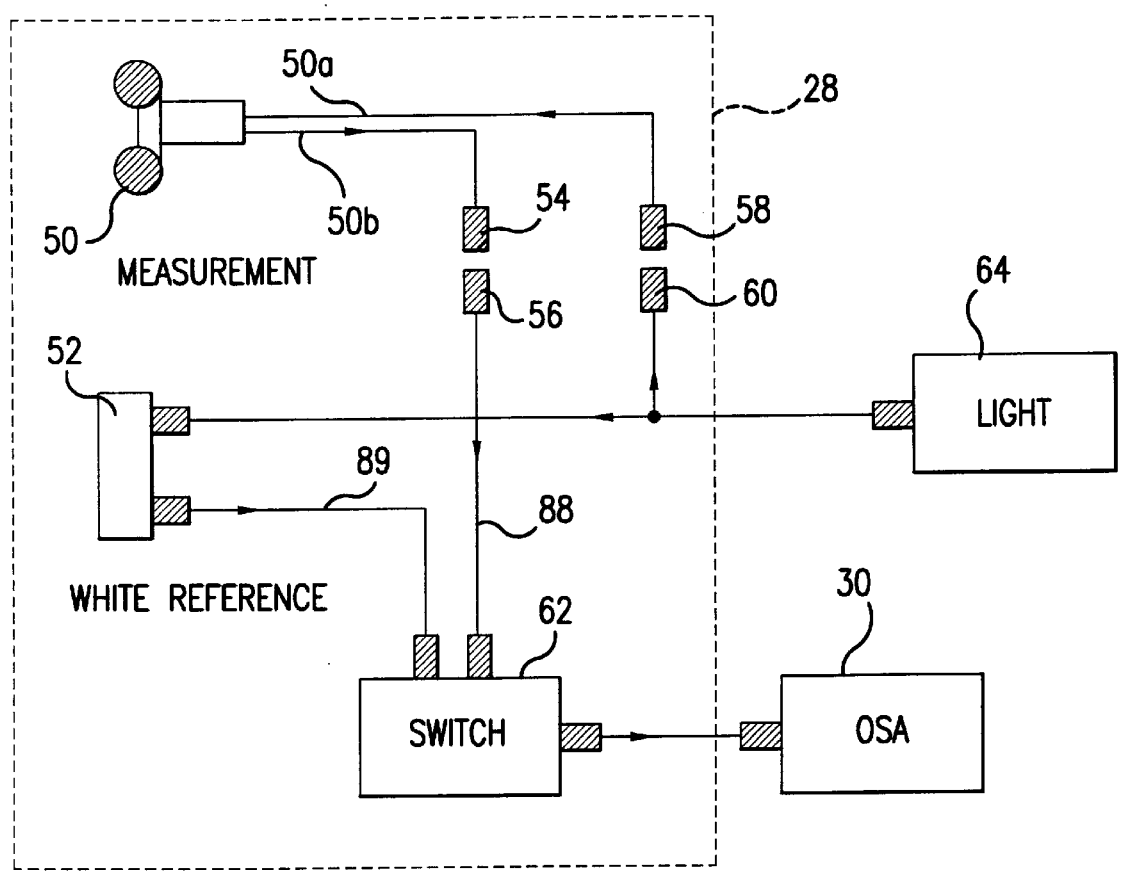
FIG. 2 is a diagrammatic representation of the on-line color sensor employed in the system of FIG. 1.

FIG. 2 is a diagrammatic representation of the on-line color sensor employed in the system of FIG. 1. As seen therein, on-line color sensor 28 comprises a measurement spool arrangement 50 and a white reference arrangement 52 in combination with optical fiber connections 54, 56, 58 and 60 and optical switch 62. As seen in FIG. 2, a light source 64 provides an optical input to both measurement spool arrangement 50 and white reference arrangement 52. More specifically, the light output of source 64 is provided via optical fiber connections 58 and 60 to measurement spool arrangement 50.

The measurement spool arrangement 50 transmits the light toward the material being wound on spool 26 (FIG. 1), and receives reflected light therefrom. The reflected light is provided via optical fiber connections 54 and 56 to one input of the switch 62, the other input of which receives white reference light reflected from white reference arrangement 52 as a result of the reception, by arrangement 52, of incident light from the light source 64.

Optical switch 62 operates, in a manner to be described in more detail below, to select either the reference light from arrangement 52 or the reflected measurement light from measurement arrangement 50 for input to the OSA 30.

Figure 3:
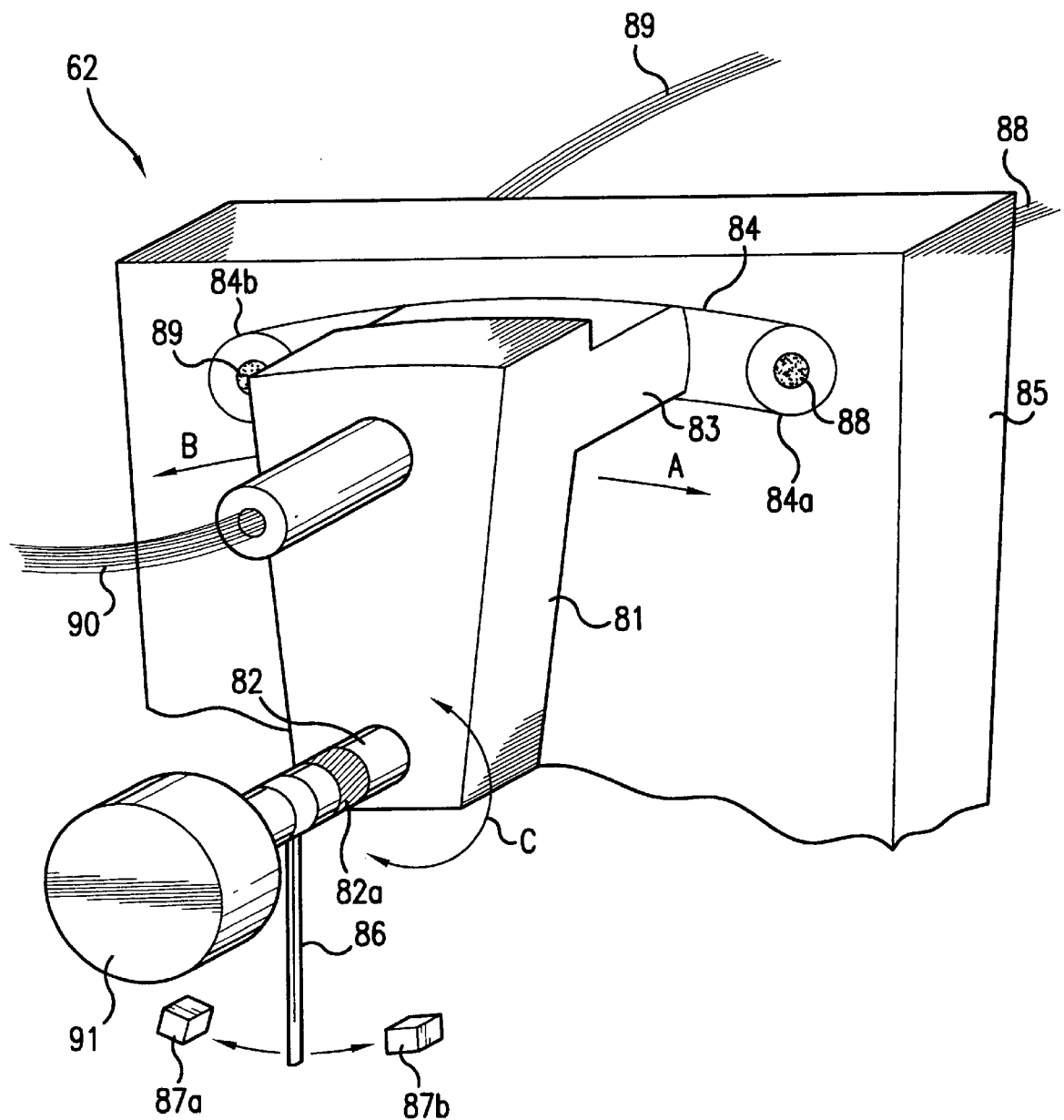
FIG. 3 is a diagram of an optical switch employed in the on-line color sensor of FIG. 2.

FIG. 3 is a diagram of an optical switch employed in the on-line color sensor of FIG. 2. As seen therein, optical switch 62 comprises the following elements: lever 81, motor shaft 82, optical fiber connector 83, grooved track 84, frame 85, contact element 86, microswitches 87a and 87b, optical fiber inputs 88 and 89, optical fiber output 90, and motor 91.

In operation, motor 91 drives lever 81 alternately between positions 84a and 84b in the grooved track 84. That is to say, lever 81 is first driven in the direction of arrow A so as to come to rest in position 84a, and is then driven in the direction of arrow B so as to come to rest in position 84b. In position 84a, the optical fiber input 88 from measurement arrangement 50 (FIG. 2) is connected to the optical fiber output 90. Alternatively, in position 84b, the optical fiber input 89 from reference arrangement 52 (FIG. 2) is connected to the optical fiber output 90. Optical fiber output 90 provides its optical fiber output to the OSA 30, as previously described above with respect to FIGS. 1 and 2.

Further referring to FIG. 3, when the optical fiber connector 83 of lever 81 is in position 84a, contact element 86 contacts microswitch 87a, thereby providing an information signal to module 34. Similarly, when optical fiber connector 83 of lever 81 is in position 84b, the contact element 86 contacts microswitch 87b, thereby providing a further information signal to module 33.

Motor 91 is programmed or controlled to alternately rotate motor shaft 82 in one of two directions, as indicated by the double-headed arrow C in FIG. 3. In this manner, the lever 81 and its associated optical fiber connector 83 are moved alternately in the directions indicated by the arrows A and B, respectively. That is to say, motor 91 moves lever 81 in the direction indicated by arrow A in FIG. 3 until it reaches position 84a, where it is stopped by the endwall of the slot 84. Similarly, motor 91 moves lever 81 in the direction indicated by arrow B until it reaches position 84b, where it is stopped by the endwall of slot 84.

With respect to the operation of the motor 91 of FIG. 3, preferably, motor 91 is normally driven in the clockwise direction by a drive signal from module 34 of FIG. 1. The motor 91 drives the lever 81 through a rubber linkage 82a (seen in FIG. 3) so that, once the lever 81 has been stopped by the endwall of slot 84 at position 84a, motor 91 continues to drive and puts the rubber linkage 82a in torsional tension, thereby firmly pressing the lever 81 against the right hand endwall of slot 84 at position 84a. When rod 86 arrives at its leftmost position and contacts microswitch 87a, an information signal is sent to module 34 (FIG. 1), and the module 34 cuts off the motor 91.

Preferably, motor 91 is a stepper motor, which has a holding torque when not moving so that the rubber linkage 82a is held in light torsion and the lever 83 is pressed against the end of the slot 84. In position 84a, a color measurement signal received via input optical fiber 88 is provided via output optical fiber 90 to module 34. Holding the lever 83 with positive pressure against the end of the slot 84 gives good optical alignment repeatability, and this has been estimated to be better than fifty micrometers.

With respect to the second cycle of operation of the lever 81 and motor 91, the module 34 is programmed so that, after a predetermined period of time (for example, once every hour or so), the motor 91 is driven by module 34 in the counter-clockwise direction, thereby changing the position of the lever 83. In this manner, the lever 83 is driven in the direction of arrow B so as to arrive at position 84b in grooved track 84. At that point, rod 86 contacts microswitch 87b so that module 34 cuts off motor 91, and module 34 takes a measurement of the reference signal provided via input optical fiber 89 (FIG. 3) and output optical fiber 90. Once the measurement of the reference signal is taken, module 34 places optical switch 62 into its original state so that another measurement cycle can commence.

Figure 4:
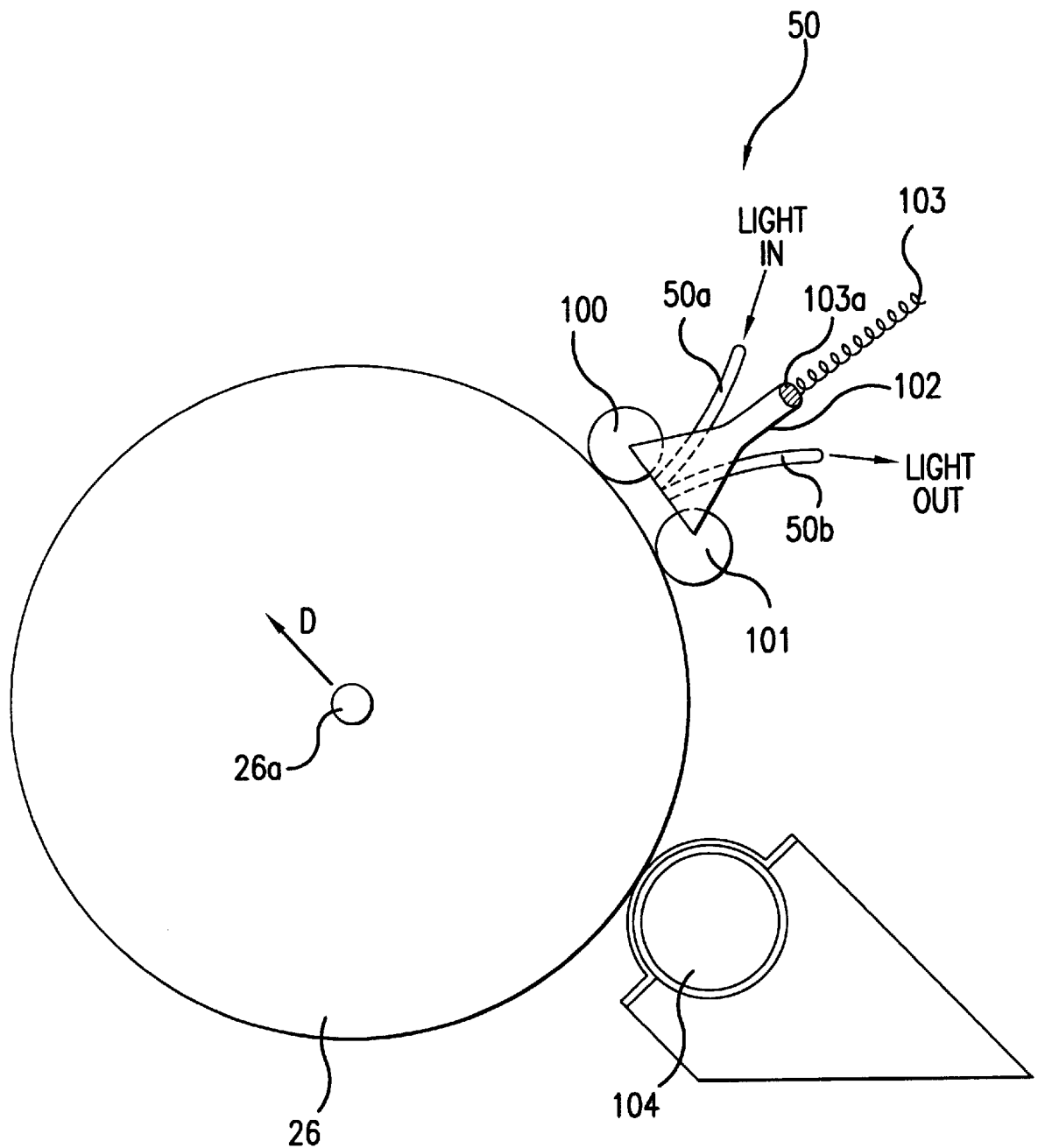
FIG. 4 is a side, cross-sectional view of a bobbin and roller, showing use of the twin-roller measuring arrangement of the present invention.

FIG. 4 is a side, cross-sectional view of a bobbin and roller, showing use of the twin-roller measuring arrangement of the present invention. As seen therein, the twin-roller measurement arrangement 50 comprises rollers 100 and 101 which are joined by a connecting frame 102 which is urged in a direction toward the spool 26 by a spring 103. Light generated by the source 64 (FIG. 2) is conveyed to a point located between the rollers 100 and 101 by optical fiber 50a, and light reflected from the material wound on the spool 26 is conveyed away from a position between rollers 100 and 101 by optical fiber 50b and, as previously mentioned, is provided via optical fiber connectors 54 and 56 and optical fiber input 88 to the optical switch 62 (FIG. 2).

In operation, spool 26 is rotated under the influence or urging of a rotating support 104. Preferably, rotating support 104 is firmly fixed in space and cannot move except for rotation. The spool 26 is free to move away from support 104 as it grows. The center of spool 26 actually traces an arc in the plane of FIG. 4 (if such an arc were to be plotted). Thus, in the preferred embodiment, pivoting action between connecting frame 102 and spring 103 takes place via the pivotal connection 103a therebetween.

It should be recognized that, although not shown in FIG. 4, the spool 26 has a motor attached to its central axle 26a so that the spool 26 is rotatable. Moreover, the entire arrangement—spool 26, axle 26a and the spool motor (not shown)—is movable as the spool 26 rotates and is filled, and thereby moves away from the rotating support 104 in the direction generally indicated by the arrow D in FIG. 4.

The twin-roller arrangement 50 is maintained in its position with respect to the rotating spool 26 as a result of the combined influence of the spring 103 (which urges the rollers 100 and 101 toward the spool 26) and the rotational capability of the rollers 100 and 101. As the spool 26 and the material wound thereon pass by the rollers 100 and 101, light provided by source 64 (FIG. 2) is conveyed via optical fiber 50a so that the light is incident on the surface of the material wound on spool 26. As a result, light is reflected from the material on spool 26, and such reflected light is conveyed away from spool 26 and rollers 100, 101 by optical fiber 50b. Such reflected light, as previously mentioned, is conveyed via optical fiber connectors 54 and 56 and optical fiber input 88 to the optical switch 62.

Figure 5A:
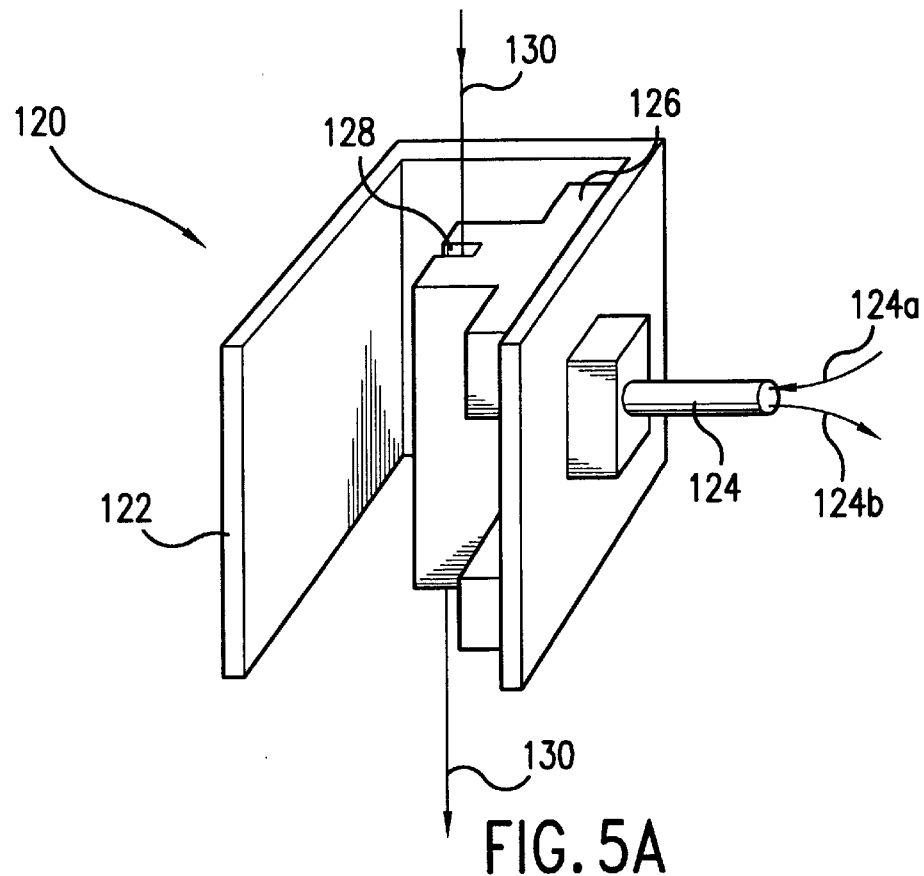
FIG. 5A is a perspective view of a yarn guide employed in the color sensor of the present invention.

FIG. 5A is a perspective view of a yarn guide employed in the color sensor of the present invention. The arrangement shown in FIG. 5A constitutes an alternative embodiment for light measurement, that is, an alternative to the twin-roller measuring arrangement 50 generally shown in FIG. 2 and described in more detail relative to FIG. 4.

As seen in FIG. 5A, yarn guide 120 comprises a U-shaped light shield 122 which, on one side thereof, receives a fiber optical bundle 124. A stainless steel block 126 having a slot 128 formed therein is mounted on an interior surface of the U-shaped light shield 122.

In operation, material emerging from the extruder 22 (FIG. 1)—for example, yarn 130 shown in FIG. 5A—is conveyed through the slot 128, in which the yarn 130 passes adjacent to illuminating fibers 124a contained within the bundle 124. Illuminating fibers 124a convey light toward the yarn 130 so as to illuminate the yarn 130, and light reflected therefrom is conveyed back through receiving fibers 124b in the bundle 124. Once the yarn 130 passes adjacent to fiber optic bundle 124, it is conveyed out the lower end of yarn guide 120 toward the spool 26.

Figure 5B:
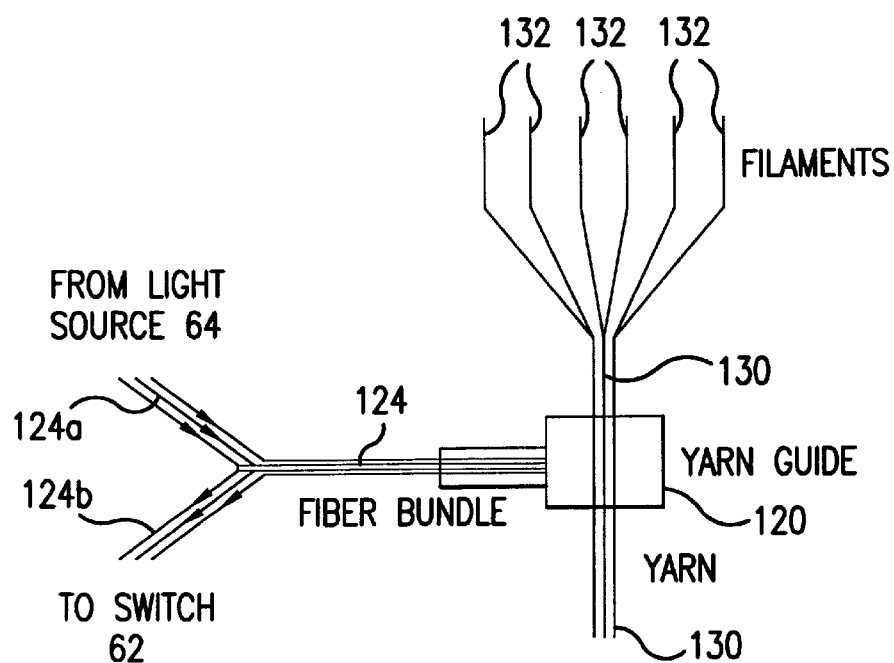
FIG. 5B is a further view of the yarn guide of the present invention employed with a fiber bundle for the purpose of transmission of light to the yarn guide and reception of sensed light from the yarn guide.

FIG. 5B is a further view of the yarn guide of the present invention employed with a fiber bundle for the purpose of transmission of light to the yarn guide and reception of sensed light from the yarn guide. In accordance with this embodiment of the invention, the yarn or fiber 130 is subjected to color measurement just as the individual extruded filaments 132 emerging from the extruder 22 (FIG. 1) are collected together. Filaments 132, once collected, form a neat reproducible ribbon of yarn 130, and are measured just before they pass through a conventional lubrication applicator (not shown).

The ribboned yarn 130 is measured, as previously described, by shining white light from source 64 (FIG. 2) on the yarn 130, and measuring the reflected or scattered light by conveying such reflected or scattered light through optical switch 62 to the OSA 30 (FIG. 2). In practice, a fiberoptic bundle 124 is utilized and, as previously described, the bundle 124 has half of its elements in the form of illuminating fibers 124a and the other half of its elements in the form of receiving fibers 124b (see FIGS. 5A and 5B).

Figure 6A:
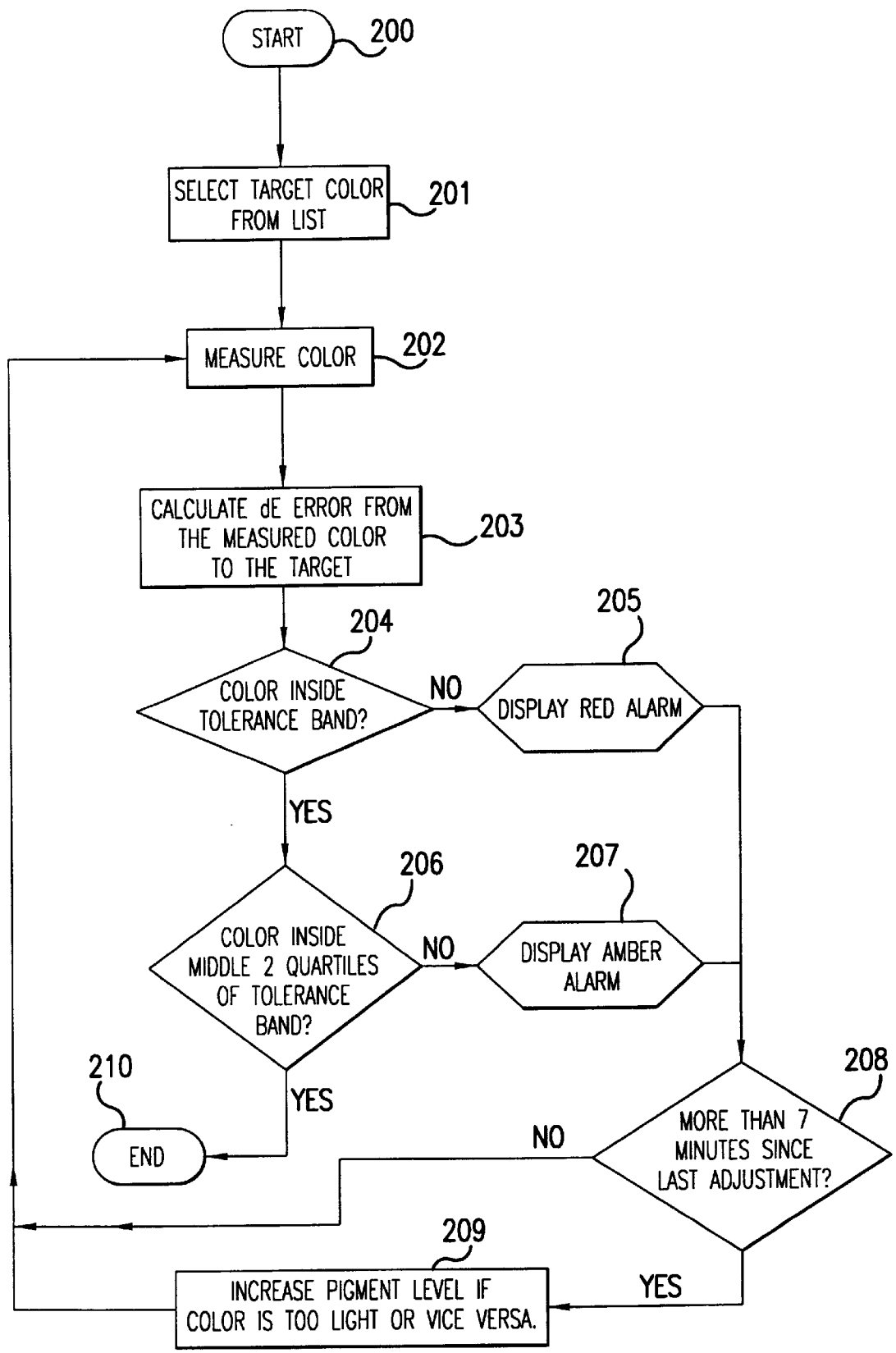
FIGS. 6A and 6B are flowcharts of software operations performed by the module (personal computer) and PLC in accordance with the present invention.
Figure 6B:
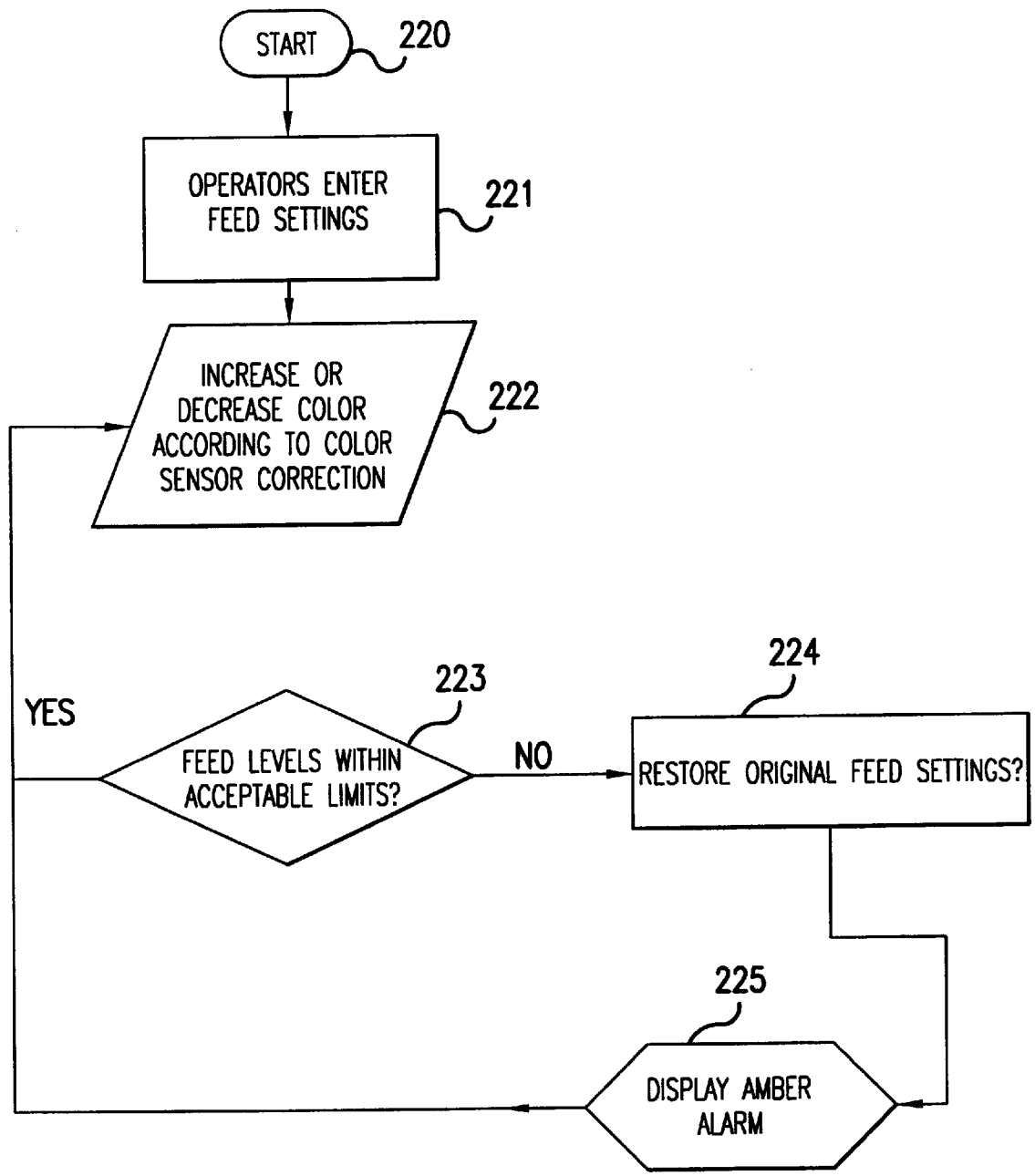

FIGS. 6A and 6B are flowcharts of software operations performed by the module (personal computer) and PLC in accordance with the present invention.

More particularly, FIG. 6A is a flowchart of the operations performed by the module 34 of FIG. 1. In that regard, module 34 of FIG. 1 is, preferably, a programmed personal computer which receives analog color sensor signals from the OSA 30. Accordingly, module 34 is equipped with an analog-to-digital converter (ADC) card or other means for digital conversion, thereby converting the analog color sensor signals from the OSA 30 to digital form prior to provision to the processor of the personal computer or module 34. Such digital data are then processed by the processor of the personal computer or module 34 in accordance with the flowchart of FIG. 6A.

Considering the flowchart of FIG. 6A in detail, the processing operation is commenced (block 200), and a target color is selected from a list of target colors (block 201). This selection of a target color is typically performed in response to an operator input via keyboard 32 of FIG. 1.

Continuing with the flowchart of FIG. 6A, in the manner described above, the color of the product wound on spool 26 is measured (block 202), and an error or disparity between the measured color and the target color is calculated (block 203). A determination is then made as to whether or not the measured color falls inside a tolerance band or acceptable limit of deviation between measured color and target color (block 204). If the color is not inside the tolerance band, then an alarm (e.g., a red indicator) is displayed on the console (block 205).

If the color is inside the tolerance band, a determination is made as to whether the color is inside the middle two quartiles of the tolerance band (block 206). If the color is not inside the middle two quartiles of the tolerance band, an alarm (e.g., an amber indicator) is displayed (block 207). In the latter regard, it has been found to be convenient to use the red/amber alarm indicator system analogous to the stop/caution indicators in traffic light systems. If the color is inside the middle two quartiles of the tolerance band, the target color has been achieved within acceptable limits, and the color sensing and control process is terminated (block 210).

Once a red alarm (block 205) or an amber alarm (block 207) is displayed, a further determination is made as to whether a time period of greater than the dwell time since the last adjustment in colorant color has passed. In the latter regard, "dwell time" is defined as the length of time that it takes for colorants to travel through the extruder. If more than the dwell time has passed since the last adjustment of coloration, the module 34 instructs the PLC 36 to increase colorant level if color is too light or to decrease colorant level if the color is too dark (block 209). This process will be described in more detail below with respect to FIG. 6B. On the other hand, if more than seven minutes has not passed since the last adjustment in coloration, no action is taken, and the process merely returns to the color measurement step (block 202).

The operations performed by the PLC 36 of FIG. 1 will now be described with reference to the flowchart of FIG. 6B. The PLC 36 commences operation (block 220), and the operator enters feed settings for the valves 16 and 18 associated with feeders 12 and 14, respectively, of FIG. 1 (block 221 of FIG. 6B). The PLC 36 then performs no further operation until it receives input from the module 34 as a result of color measurement performed in accordance with the flowchart of FIG. 6A. If, as a result of the flowchart of FIG. 6A, it is determined that color adjustment is needed, and if there has been more than seven minutes since the last adjustment in color (see blocks 205, 207 and 208 of FIG. 6A), then an increase or decrease in colorant level is indicated, and the PLC 36 responds to a control input from the module 34 by increasing or decreasing the colorant color according to the color measurement (see block 222 of FIG. 6B).

As a next step, the PLC 36 determines whether the feed levels for feeders 12 and 14 of FIG. 1 are within acceptable limits (block 223). If the feed levels are within acceptable limits, then the PLC 36 awaits further control input from the module 34 and further adjusts colorant color based on color evaluation performed by the module 34 (block 222 of FIG. 6B).

If the feed levels are not within acceptable limits (block 223), original feed settings for the valves 16 and 18 are restored by the PLC 36 (block 224 of FIG. 6B), and an alarm is sounded (block 225). Once the alarm is sounded, PLC 36 then awaits further control inputs from the operator via keyboard 32 or from the module 34 as a result of further color evaluation.

While preferred forms and arrangements have been shown in illustrating the invention, it is to be understood that various changes and modifications may be made without departing from the spirit and scope of this disclosure.

What is claimed is:

1. An on-line color monitoring and control system, comprising:

feeder means for feeding colorant in a given amount in order to achieve a desired color of a product;

mixer means for mixing said colorant in order to obtain said product;

light source means for generating light and directing said light toward said product so as to produce reflected light from said product, and producing a reference light;

sensor means responsive to said reflected light and said reference light for measuring an optical characteristic of said product and providing a color sensor output; and processing means for processing the color sensor output to generate at least one control signal for provision to said feeder means, whereby to adjust the given amount of colorant fed by said feeder means to said mixer means;

wherein said product comprises one of a single moving fiber, a single moving yarn, a single moving filament of a yarn, and a collection of fibers.

2. The system of claim 1, further comprising optical switch means disposed between said light source means and said sensor means for receiving and switchably providing said reflected light and said reference light to said sensor means.

3. The system of claim 2, wherein said optical switch means comprises:

a frame having a recess formed therein, said recess having a first portion for receiving an optical fiber element carrying said reflected light and a second portion for receiving an optical fiber element carrying said reference light;

a movable member seated within said recess and movable therein, said movable member holding an optical fiber output element;

a motor connected to said movable member for moving said movable member so as to alternately locate said optical fiber element in said first portion of said recess for contact with said optical fiber element carrying said reflected light, and in said second portion of said recess for contact with said optical fiber element carrying said reference light;

a shaft connecting said motor to said movable member; and an elastic linkage mounted on said shaft and responsive to movement of said movable member by said motor for creating a torsional tension firmly pressing said optical fiber element into contact with said optical fiber elements carrying said reflected light and said reference light, respectively.

4. The system of claim 1, wherein said feeder means includes at least one valve responsive to a control signal from said processing means for adjusting the given amount of said colorant in order to achieve the desired color of said product.

5. The system of claim 1, wherein said mixer means includes an extruder for performing an extrusion process to obtain said product.

6. The system of claim 1, further comprising spool means for spooling said product.

7. The system of claim 6, wherein said sensor means senses the color characteristic of said product after spooling.

8. The system of claim 7, wherein said sensor means comprises:

a frame;

at least one roller mounted on said frame for contact with said product on said spool means;

a first optical fiber for conveying said light directed toward said product; and a second optical fiber for conveying said reflected light away from said product.

9. The system of claim 8, wherein said sensor means further comprises a spring connected to said frame for urging said frame toward said spool means.

10. The system of claim 6, wherein said sensor means senses said color characteristic of said product prior to spooling.

11. The system of claim 10, wherein said sensor means comprises:

a guide through which said product passes;

a first optical fiber for carrying said light toward said product as said product passes through said guide; and a second optical fiber for conveying said reflected light away from said product.

12. The system of claim 11, wherein said guide comprises an element having a block mounted on an interior surface of said element, said block having a groove formed on a surface thereof for conveying said product through said guide.

13. The system of claim 1, wherein said sensor means comprises a guide through which said product passes and a detector, and wherein at least one of said light source means and said detector is disposed inside said guide.

14. The system of claim 1, wherein said processing means comprises:

a measurement module for measuring the color characteristic of said product and for comparing the measured color characteristic to a desired color characteristic to obtain an adjustment output; and a controller responsive to said adjustment output for generating said at least one control signal for provision to said feeder means.

15. The system of claim 14, further comprising operator input means responsive to an operator input for setting said desired color characteristic in said measurement module.

16. An on-line color monitoring and control system, comprising:

feeder means for feeding colorant in a given amount in order to achieve a desired color of a product;

mixer means for mixing said colorant in order to obtain said product;

spool means for spooling said product;

sensor means for sensing a color characteristic of said product and providing a color sensor output; and processing means for processing the color sensor output to generate at least one control signal for provision to said feeder means, whereby to adjust the given amount of colorant fed by said feeder means to said mixer means;

wherein said sensor means senses said color characteristic of said product after spooling.

17. The system of claim 16, wherein said sensor means comprises:

a frame;

at least one roller mounted on said frame for contact with said product on said spool means;

a first optical fiber for conveying light toward said product; and a second optical fiber for conveying reflected light away from said product.

18. The system of claim 17, wherein said sensor means further comprises a spring connected to said frame for urging said frame toward said spool means.

19. An on-line color monitoring and control system, comprising:
- feeder means for feeding colorant in a given amount in order to achieve a desired color of a product;
- mixer means for mixing said colorant in order to obtain said product;
- spool means for spooling said product;
- sensor means for sensing a color characteristic of said product and providing a color sensor output; and
- processing means for processing the color sensor output to generate at least one control signal for provision to said feeder means, whereby to adjust the given amount of colorant fed by said feeder means to said mixer means;
- wherein said sensor means senses said color characteristic of said product prior to spooling.

20. The system of claim 19, wherein said sensor means comprises:
- a guide through which said product passes;
- a first optical fiber for conveying light toward said product as said product passes through said guide; and
- a second optical fiber for conveying reflected light away from said product.

21. The system of claim 20, wherein said guide comprises a U-shaped element having a block mounted on an interior surface of said U-shaped element, said block having a groove formed on a surface thereof for conveying said product through said guide.

22. The system of claim 19, wherein said sensor means comprises a guide through which said product passes and a detector disposed inside said guide.

23. A method for monitoring and controlling a color of a product, comprising the steps of:
- (a) feeding colorant in a given amount in order to achieve a desired color of said product;
- (b) mixing said colorant in order to obtain said product;
- (c) measuring a color characteristic of said product;
- (d) comparing the measuring color characteristic to the desired color of said product in order to obtain an error;
- (e) determining whether the measured color characteristic falls within a tolerance band surrounding the desired color of said product; and
- (f) adjusting the given amount of said colorant fed during step (a) in order to adjust the color characteristic of said product;
- wherein step (e) comprises the steps of:
  - determining whether the measured color characteristic of said product falls within a first tolerance band surrounding the desired color of said product;
  - displaying a first alarm signal if the measured color characteristic falls outside said first tolerance band;
  - determining whether the measured color characteristic falls within a second, narrower tolerance band; and
  - displaying a second alarm signal if said measured color characteristic falls outside said second tolerance band.

24. The method of claim 23, further comprising the steps of:
- if one of said first alarm signal and said second alarm signal is displayed, determining whether the amount of colorant has been adjusted within a predetermined amount of time prior to a present time; and
- wherein step (f) comprises adjusting the amount of said colorant only if the amount of said colorant has not been adjusted within said predetermined period of time prior to the present time.

25. The method of claim 23, comprising the step, prior to step (a), of entering feed settings via an operator input.

26. A method for monitoring and controlling a color of a product, comprising the steps of:
- (a) feeding colorant in a given amount in order to achieve a desired color of said product;
- (b) mixing said colorant in order to obtain said product;
- (c) measuring a color characteristic of said product;
- (d) comparing the measuring color characteristic to the desired color of said product in order to obtain an error;
- (e) determining whether the measured color characteristic falls within a tolerance band surrounding the desired color of said product; and
- (f) adjusting the given amount of said colorant fed during step (a) in order to adjust the color characteristic of said product;
- wherein step (f) comprises the steps of:
  - determining whether the amount of colorant has been adjusted within a predetermined period of time prior to a present time; and
  - adjusting the amount of colorant only if the amount of colorant has not been adjusted within said predetermined period of time prior to the present time.

27. A method for monitoring and controlling a color of a product, comprising the steps of:
- (a) feeding colorant in a given amount in order to achieve a desired color of said product;
- (b) mixing said colorant in order to obtain said product;
- (c) measuring a color characteristic of said product;
- (d) comparing the measuring color characteristic to the desired color of said product in order to obtain an error;
- (e) determining whether the measured color characteristic falls within a tolerance band surrounding the desired color of said product;
- (f) adjusting the given amount of said colorant fed during step (a) in order to adjust the color characteristic of said product;
- (g) determining whether the amount of colorant fed during step (a) falls within acceptable limits; and
- (h) if the amount of colorant fed during step (a) does not fall within acceptable limits, restoring original settings of the amount of colorant to be fed.

28. The method of claim 27, further comprising the step, subsequent to step (h), of displaying an alarm indicating the restoration of original feed settings.

* * * * *